Oct. 25, 1966  P. C. HITCHCOCK  3,280,451
METHOD FOR MANUFACTURING ELECTRIC FUSE TERMINALS
Original Filed Nov. 2, 1962  3 Sheets-Sheet 1
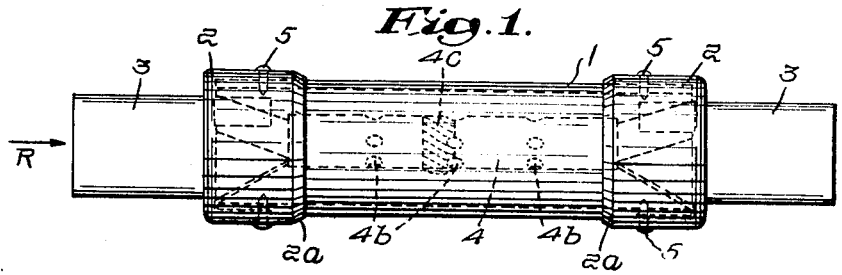
Fig.1.
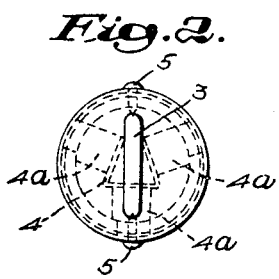
Fig.2.
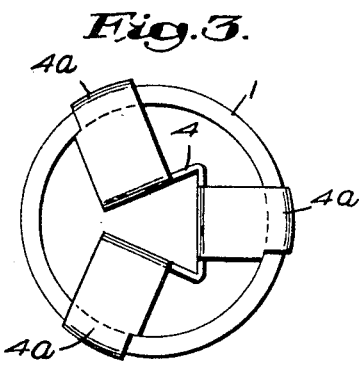
Fig.3.
Fig.4.
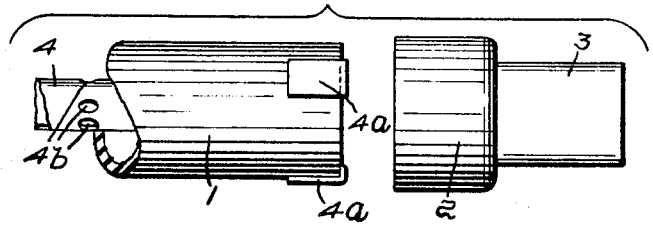
Inventor:
Paul C. Hitchcock,
by [signature]
Attorney

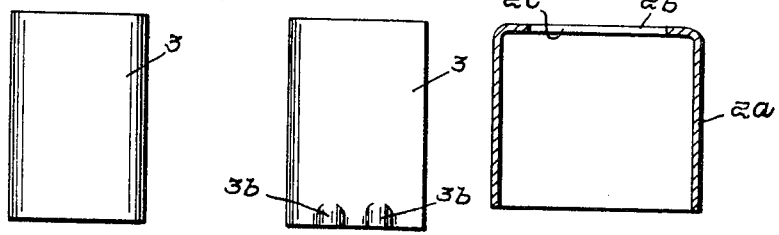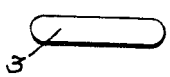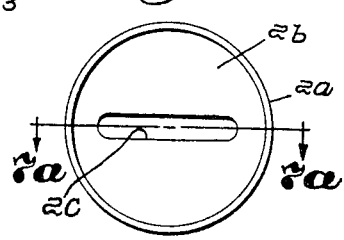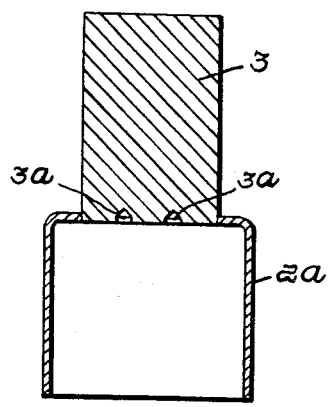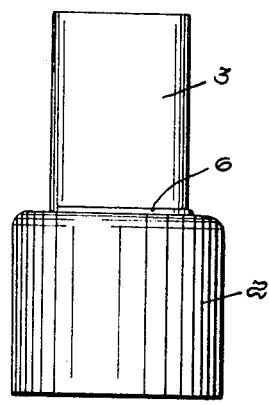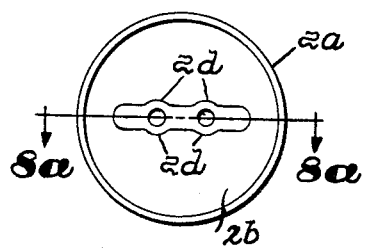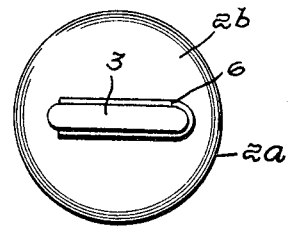

Oct. 25, 1966

P. C. HITCHCOCK 3,280,451

METHOD FOR MANUFACTURING ELECTRIC FUSE TERMINALS

Original Filed Nov. 2, 1962

Inventor:
Paul C. Hitchcock,
by [signature]
Attorney

United States Patent Office 3,280,451
Patented Oct. 25, 1966

3,280,451
METHOD FOR MANUFACTURING ELECTRIC FUSE TERMINALS
Paul C. Hitchcock, Plum Island, Mass., assignor to The Chase-Shawmut Company, Newburyport, Mass.
Original application Nov. 2, 1962, Ser. No. 234,963, now Patent No. 3,222,482, dated Dec. 7, 1965. Divided and this application Oct. 28, 1963, Ser. No. 326,651
2 Claims. (Cl. 29—155.55)

This application is a division of Serial No. 234,963, filed November 2, 1962, for Electric Fuse Terminals and Method for Manufacturing the Same, now Patent No. 3,143,615, granted April 4, 1964.

This invention relates to a process for manufacturing electric fuses.

Electric fuses include generally a tubular casing of insulating material which is closed on both ends thereof by terminal caps or ferrules. Fuses having a relatively small current rating are placed into fuse holders adapted to engage the aforementioned terminal caps or ferrules. Fuses having a relatively high current rating are placed into fuse holders adapted to engage a pair of knife blade contacts, each of said pair of knife blade contacts being integral with one of a pair of terminal caps or ferrules. This invention is concerned with fuses having terminal caps or ferrules including a knife blade contact forming an integral part thereof.

Terminal caps or ferrules are generally made of relatively thin sheet metal formed to have the shape of a cap, i.e. to include a lateral cylindrical surface and a flat end surface. Knife blade contacts are generally stampings made of copper bars which are considerably thicker than the metal of which the terminal caps or ferrules are formed. The knife blade contacts are generally rectangular, and the cross-section thereof is also generally rectangular. One of the narrow edges of a knife blade contact must be secured to the flat end surface of a terminal cap to form an integral unit adapted to be mounted on one of the ends of the tubular casing of an electric fuse.

The process of attaching the knife blade contacts to the terminal caps or ferrules of an electric fuse to integrate both parts in the aforementioned manner into a self-contained structural unit, or sub-assembly, involves certain difficulties which have not been overcome heretofore.

It is, therefore, one object of the invention to provide an improved process for making terminal structures for electric fuses comprising a cap, and a knife blade contact integral with the cap.

Another object of this invention is to provide an improved method involving a swaging operation for integrating terminal caps and knife blade contacts into self-contained structural units or sub-assemblies adapted to be readily mounted upon the casings of electric fuses.

Generally knife blade contacts are brazed to the end surfaces of terminal caps. Such a brazing operation calls for expensive jigs, requires a relatively large skill if performed manually, tends to result in a non-uniform product, and is generally accompanied by annealing of the knife blade contacts, which is highly undesirable.

It is, therefore, another object of the invention to provide sub-assemblies comprising terminal caps and integral knife blade contacts which sub-assemblies can be manufactured without the drawbacks and limitations to which the aforementioned prior art brazing processes are subject.

It is possible to combine terminal caps and knife blade contacts by providing the end surfaces of the former with apertures and by providing the edge zones of the latter with projections which are inserted into the aforementioned apertures and thereafter upset in the fashion of the shank of a rivet. This rivetting process can only be successively performed if the thickness of the cap is excessive, and this rivetting process is not satisfactory where relatively thin sheet metal is used for forming the caps, e.g. sheet metal having a thickness in the order of 30/1000 inch.

It is, therefore, another object of this invention to provide an improved process for making sub-assemblies comprising terminal caps and integral knife blade contacts wherein the terminal caps are formed of relatively thin sheet metal.

Another object of this invention is to provide improved processes for manufacturing sub-assemblies comprising terminal caps and knife blade contacts integral with the caps which processes are not subject to the limitations and disadvantages of joining the caps and the contacts by conventional brazing and/or rivetting processes.

Further objects and advantages of the invention will become apparent as this description proceeds, and the features of novelty which characterize the invention will be pointed out with particularity in the claims annexed to, and forming part of, this specification.

For a better understanding of the invention reference may be had to the accompanying drawings wherein FIG. 1 is a front elevation of an electric fuse embodying the invention;

FIG. 2 is a side elevation of the structure shown in FIG. 1 seen in the direction of the arrow R of FIG. 1;

FIG. 3 shows in side elevation a detail of the structure shown in FIG. 1;

FIG. 4 is a front elevation of one end of the casing of the structure shown in FIG. 1 and a front elevation of the sub-assembly unit including a terminal cap and a knife blade contact prior to mounting said sub-assembly unit upon the casing of the fuse;

FIGS. 5a and 5b are a front view and a top plan view, respectively, of the knife blade contact as such produced by a stamping, blanking or chopping operation;

FIGS. 6a and 6b show the same part as shown in FIGS. 5a and 5b upon having been upset or widened by a pointed upsetting tool or mandrel;

FIG. 7a is a vertical section along 7a—7a of FIG. 7b and shows a terminal cap or ferrule made of a relatively thin sheet metal and being provided with an oblong hole or aperture in the end surface thereof, FIG. 7b showing in bottom view the same terminal cap as FIG. 7a;

Figure 10:
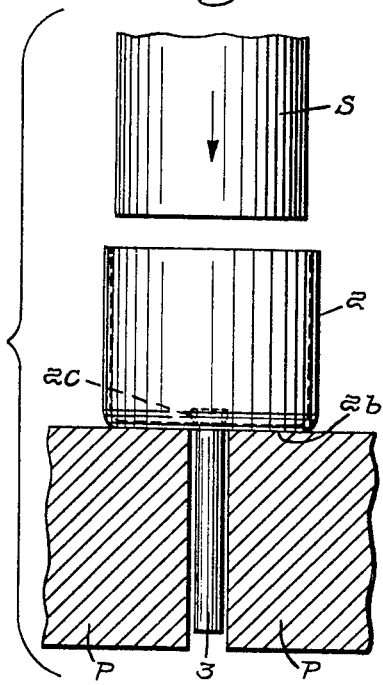
Figure 11A:
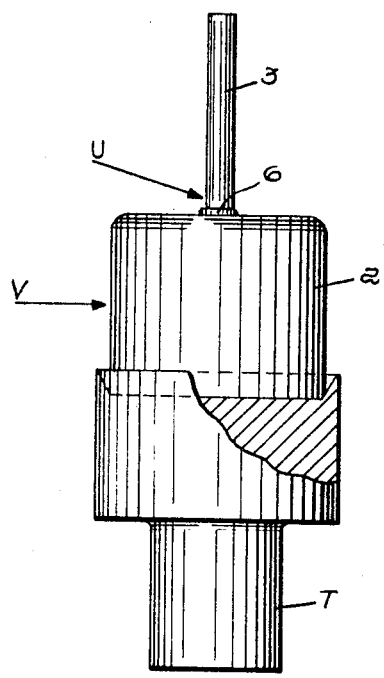
Figure 12:
Figure 11B:
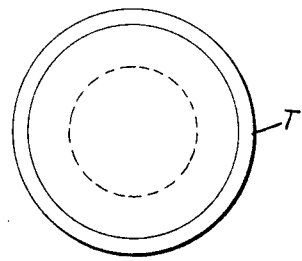

FIG. 8a is a section along 8a—8a of FIG. 8b and shows the knife blade contact of FIGS. 6a and 6b upon having been mechanically joined to the ferrule or terminal cap of FIGS. 7a and 7b, and FIG. 8b is a bottom plan view of the sub-assembly shown in FIG. 8a;

FIGS. 9a and 9b are a front view and a top plan view, respectively, of the sub-assembly shown in FIGS. 8a and 8b upon having been provided with a so-called brazing pre-form;

FIG. 10 is a diagrammatic representation of the swaging process by which the terminal cap and the knife blade contact are joined together into a self-sustained structural unit;

FIG. 11a illustrates a jig or fixture for peforming a brazing process for establishing a current path of low resistance between the knife blade contact and the terminal cap and shows also how the knife blade contact is being brazed to the terminal cap, and FIG. 11b is a top plan view of the jig or fixture illustrated in FIG. 11a; and FIG. 12 is a side elevation of a gang upsetting tool or of a two-pronged tool for upsetting blade contacts.

Referring now to the drawings, and more particularly to FIGS. 1 to 4 thereof, numeral 1 has been applied to indicate a tubular casing of insulating material closed on both ends by terminal caps, or ferrules 2. Blade contacts 3 form integral parts of caps 2 as will be shown below more in detail. Fuse link 4 is made of a metal having a relatively high fusing point such as silver or copper and is arranged inside of casing 1 and conductively interconnects caps 2 on the ends of casing 1. The preponderant portion of the entire length of link 4 is substantially in the shape of a prism, triangular in cross-section, as can best be seen in FIG. 3. Each panel of link 4 is provided with an indexed tab 4a bent over one of the rims of casing 1 to the outside of casing 1. This has been clearly shown in FIG. 3. Fuse link 4 is provided with four transverse lines of perforations 4b, and an overlay 4c of a metal having a relatively low fusing point, e.g. tin is arranged immediately adjacent the line of perforations in the center region of casing 1. The object of overlay 4c is to initiate interruption of an overloaded circuit on occurrence of relatively small protracted overloads. The particular geometry of overlay 4c which I prefer is more fully disclosed in U.S. Patent 2,988,620 to Frederick J. Kozacka, Time-Lag Fuses, June 13, 1961, and reference may be had to that patent for additional details in regard to the preferred position of overlay 4c on link 4. The theory underlying the geometry of the particular fuse link shown in FIGS. 1–4 is more fully described in the copending patent application of Frederick J. Kozacka, Ser. No. 185,618, filed April 6, 1962 for Springless Time-Lag Fuses for Motor Circuits, now U.S. Patent 3,143,615; issued April 4, 1964. The axially inner ends of ferrules or terminal caps 2 are crimped as indicated at 2a and a pair of pins 5 project transversely through the cylindrical lateral surface of each terminal cap into casing 1, thus firmly securing caps 2 to casing 1. Casing 1 is preferably filled with a pulverulent arc-quenching filler such as, for instance, quartz sand.

The right side of FIG. 4 indicates how the sub-assembly 2, 3 comprising a cap 2 and a knife blade contact 3 is to be mounted on casing 1, establishing a pressure contact between the portions of tabs 4a situated on the outside of casing 1 and the inner surfaces of terminal caps 2. It is desirable to establish a solder joint at the point of engagement between each tab 4a and one of the two terminal caps 1 to minimize the resistance of the current path through the fuse, these solder joints not having been shown in the drawings.

FIGS. 5a to 11a illustrate the various steps in the process of manufacturing the sub-assembly shown at the right of FIG. 4. The first step may consist in chopping from a relatively long copper bar relatively short sections to be used as knife blade contacts. One such section has been illustrated in FIGS. 5a and 5b.

The next step consists in driving a pointed mandrel or upsetting tool into one of the narrow edges of a knife blade contact in a direction longitudinally of the contact. FIG. 12 shows such a tool including two conical prongs intended to be gang operated. A pair of spaced conical recesses or cavities 3a is formed inside of blade contacts 3 at the two points thereof where the prongs of the pointed mandrels or upsetting tools penetrate into them. At the points where the pointed mandrels penetrate into them the thickness of blade contacts 3 is considerably increased. The points of blade contacts where their thickness is increased are indicated by reference character 3b. Points 3b are formed by short substantially semi-cylindrical ribs 3b. As shown in FIGS. 7a and 7b the terminal caps or ferrules 2 comprise a lateral cylindrical surface 2a and a flat end surface 2b, the latter being provided with an oblong aperture or slot 2c. The geometry of aperture or slot 2c is substantially the same as the geometry of the cross-section of blade contact 3. To be more specific, the aperture or slot 2a is similar to the cross-sectional area of blade contact 3, but slightly larger, thus making it possible to readily insert the end of blade contact 3 remote from its upset or widened edge into a slot 2c. There is some play between the edges bounding slot 2c and blade contacts 3 as characteristic of a loose fit. Blade contact 3 may loosely be moved inside of slot 2a until the ribs or lateral projections 3b engage the end surface 2b of terminal cap 2.

The next step consists in driving blade contact 3 under pressure against terminal cap 2. An arrangement for performing this operation is shown in FIG. 10. Cap 2 is inverted and rests with the end surface 2b thereof upon a pair of spaced parallels P. Plunger S is arranged above terminal cap 2 and adapted to drive knife blade contact 3 downwardly until the widened upper edge thereof is substantially flush with the end surface 2b of cap 2. FIG. 10 shows knife blade contact 3 in the limit position thereof reached by unobstructed sliding within the elongated or oblong slot 2c. Further downward movement of blade contact 3 requires pressure which is exerted by a downward movement of plunger S. As this downward movement is performed the two ribs 3b swage the end surface 2b of cap 2, i.e. they locally increase the width of slot 2c at the points thereof where the thickness of ribs 3b plus the thickness of knife blade contact 2 exceeds the width of slot 2c.

In FIG. 8b reference numeral 2d has been applied to indicate the recesses produced in the end surface 2b of cap 2 by penetration into it of ribs 3b of knife blade contacts 3 and concomitant displacement of a portion of the metal of which cap 2 is made transversely to the direction of the movement of plunger S and knife blade contact 3.

The sub-assembly produced by this swaging process can readily be handled, cap 2 and blade contact 3 being firmly joined into a unitary structure. A fine fissure-like gap is formed between the knife blade contact 2 and the terminal cap 2 at the points of the latter where it has been engaged by widened portions of knife blade contact 3, i.e. where the inner edges of slot 2c are juxtaposed by portions of the knife blade contact 3 which have not been widened by the previous upsetting operation performed with the two-pronged tool shown in FIG. 12. This fissure-like fine gap must now be closed. This is achieved by means of a substantially U-shaped length of wire made of a brazing material such as an appropriate silver alloy. FIGS. 9a and 9b show such a length of brazing material or a brazing pre-form 6 placed upon the end surface 2b of cap 2 around blade contact 3, closely hugging the latter. Thereupon the sub-assembly 2, 3 is placed upon a substantially cylindrical support of a heat resistant in organic material such as that known as Transite. Such a support with a sub-assembly 2, 3 on it has been shown in FIG. 11 and reference character T has been applied to indicate the support. While the sub-assembly is in the support T two jets of ignited gas are directed against it, one jet U being directed against knife blade contact 3 and another jet V against terminal cap 2. While jets U, V are impinging upon knife blade contact 3 and upon cap 2 support T is being rotated about the vertical axis thereof. This results in rapid, even heating of sub-assembly 2, 3 and fusion of the brazing pre-form 6. The fused brazing compound of which pre-form 6 is made is attracted by capillary action into the small fissure-like gap formed between cap 2 and knife blade contact 3. Because the mass of the pre-form 3 is small fusion occurs very rapidly. Thus production proceeds very rapidly and there is little danger that the blade contacts become heated to the point where substantial annealing thereof takes place.

It will be understood that I have illustrated and described herein a preferred embodiment of my invention, and that various alterations may be made in the details of the structure shown and of the process for making the same without departing from the spirit and scope of the invention as defined in the appended claims.

I claim as my invention:
1. A process for manufacturing terminal structures to be mounted on tubular casings of electric fuses comprising in combination the steps of

(a) driving a pointed upsetting tool into the edge of a knife blade contact in a direction longitudinally thereof and thereby effecting a local widening of said edge; of (b) inserting the edge of said blade contact opposite said widened edge thereof into a complementary aperture of slightly larger dimensions formed in the end surface of a terminal cap of relatively thin sheet metal; of (c) locally widening said aperture by relative movement of said cap and said blade contact in a direction longitudinally thereof until said widened edge lies substantially flush with the end surface of said cap and a fine gap is formed between said edge and said aperture in said cap; of (d) placing a length of wire of brazing material substantially in the shape of a U on said end surface of said cap around said blade contact; and of (e) causing fusion of said length of wire to cause the fine gaps formed between said cap and said blade contact to be filled with said brazing material on account of the capillary attraction of said gaps for said brazing material.

2. A process for manufacturing terminal structure to be mounted on tubular casing of electric fuses comprising in combination the steps of (a) driving a pointed upsetting tool into the edge of a knife blade contact in a direction longitudinally thereof and thereby effecting a local widening of said edge; of (b) inserting the edge of a blade contact opposite said widened edge thereof into a complementary aperture of slightly larger dimensions formed in the end surface of a terminal cap of relatively thin sheet metal; of (c) locally widening said aperture by relative movement of said cap and said blade contact in a direction longitudinally thereof until said widened edge lies substantially flush with the end surface of said gap and thereby forming fine gaps between said cap and said blade contact; of (d) placing a length of wire of a fusible electroconductive material on said end surface of said cap adjacent said blade contact; and of (e) causing fusion of said length of wire to cause the fine gap between said cap and said blade contact to be filled with said electroconductive material on account of the capillary attraction by said gaps of said electroconductive material.

References Cited by the Examiner

UNITED STATES PATENTS

| | | | |
|---|---|---|---|
| 473,567 | 4/1892 | Curtis | 29—155.5 |
| 1,341,401 | 5/1920 | Weisgerber | 200—132 |
| 2,033,633 | 3/1936 | Hawksley | 29—155.5 |
| 2,964,835 | 12/1960 | Hay | 29—155.5 |
| 3,037,266 | 6/1962 | Pfister | 29—155.69 X |
| 3,159,775 | 12/1964 | Ingraham | 29—155.55 X |

JOHN F. CAMPBELL, *Primary Examiner.*

R. W. CHURCH, *Assistant Examiner.*